United States Patent
Kinnard

(10) Patent No.: US 8,552,586 B2
(45) Date of Patent: Oct. 8, 2013

(54) STANDBY POWER CONTROL IN A MULTIPLE POWER SUPPLY ENVIRONMENT

(75) Inventor: J. Rothe Kinnard, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 835 days.

(21) Appl. No.: 12/767,337

(22) Filed: Apr. 26, 2010

(65) Prior Publication Data

US 2011/0261547 A1    Oct. 27, 2011

(51) Int. Cl.
  *H02J 1/10* (2006.01)
(52) U.S. Cl.
  USPC ............................................. 307/43
(58) Field of Classification Search
  USPC ............................................. 307/43
  See application file for complete search history.

(56) References Cited

U.S. PATENT DOCUMENTS

2004/0109374 A1*  6/2004  Sundar ................... 365/226

\* cited by examiner

*Primary Examiner* — Robert L. Deberadinis
(74) *Attorney, Agent, or Firm* — Brooks Kushman P.C.

(57) ABSTRACT

A system for standby power control in a multiple power supply environment is provided. The system includes a plurality of power supplies. Each power supply has a standby voltage output, and has a standby voltage enable signal input. A signal line connects to each power supply at the respective standby voltage enable signal input. A resistance is connected between the signal line and a system reference. The plurality of power supplies are configured such that the resistance determines a number of power supplies that must be available before the standby voltage outputs are activated by the power supplies.

18 Claims, 5 Drawing Sheets

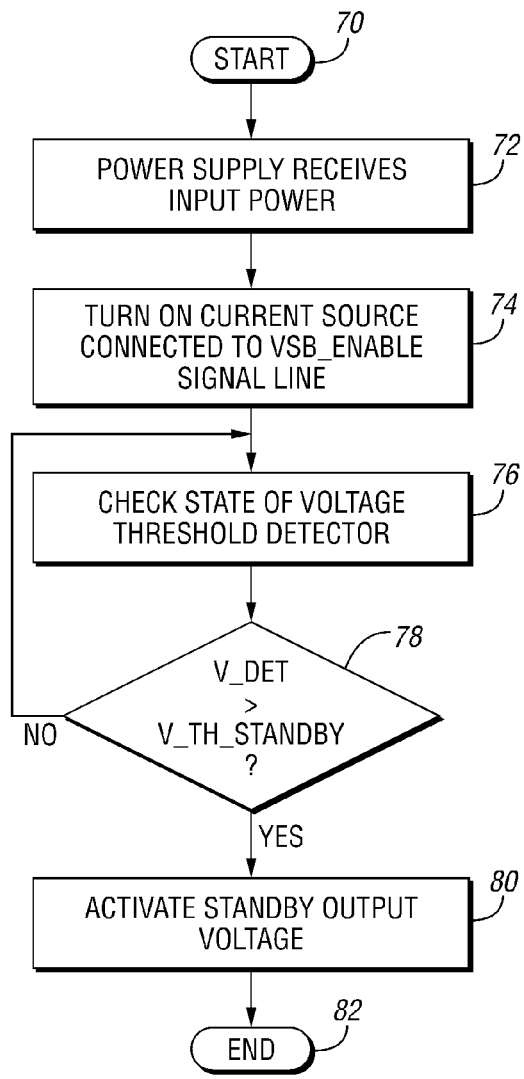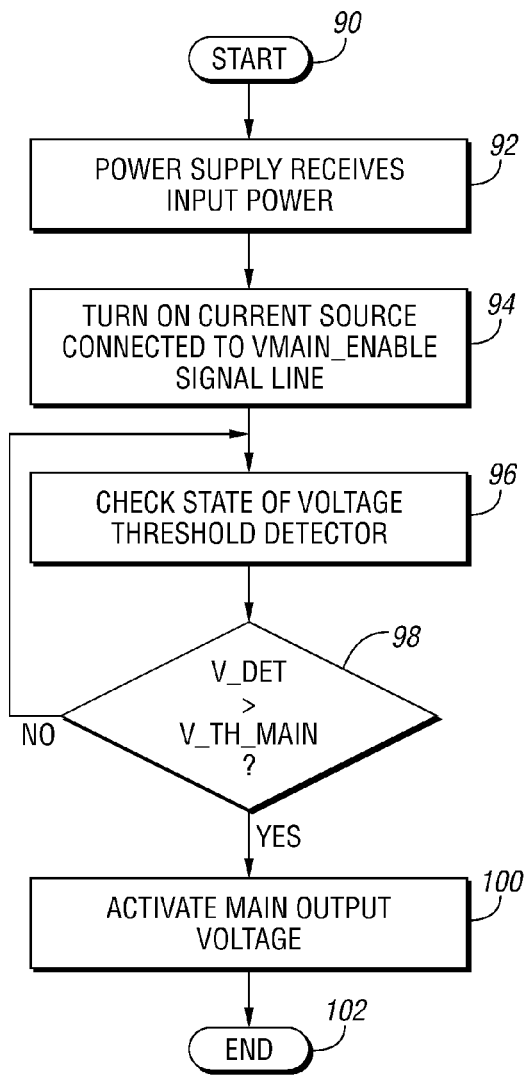
Fig. 5
Fig. 6

STANDBY POWER CONTROL IN A MULTIPLE POWER SUPPLY ENVIRONMENT

TECHNICAL FIELD

The invention relates to standby power control in a multiple power supply environment.

BACKGROUND

The use of a multiple power supply environment in a computing system has become widespread. For example, a blade server is a stripped down server computer with a modular design optimized to minimize the use of physical space and energy. A blade enclosure holds multiple blade servers and provides services such as power, cooling, networking, various interconnects and management. Together, the blade servers and the blade enclosure form the blade system. The blade system includes the multiple blade servers, and includes multiple power supplies. In the typical multiple power supply environment for a computing system, the capacity of the main voltage output of the power supplies is usually sized for N+1 redundancy such that one supply can fail or be removed for service with the system in operation.

Many modern computing systems have a standby mode. To operate in the standby mode, the computer system may only require a lower, standby voltage from the power supply. A modern power supply often has a separate standby voltage output, in addition to the main voltage output. When a power supply receives input power, the power supply provides the standby voltage. Main voltage outputs are turned on later, possibly in response to a signal from a system controller.

SUMMARY

In one embodiment of the invention, a system for standby power control in a multiple power supply environment is provided. The system comprises a plurality of power supplies. Each power supply has a standby voltage output and has a standby voltage enable signal input. The system further comprises a signal line connected to each power supply at the respective standby voltage enable signal input, and a resistance connected between the signal line and a system reference. The plurality of power supplies are configured such that the resistance determines a number of power supplies that must be available before the standby voltage outputs are activated by the power supplies.

It is appreciated that the resistance may have a fixed resistance value or a variable resistance value depending on the application. For example, the system may further comprise a plurality of system components, with the resistance being a variable resistance component connected to the plurality of system components. In this case, the resistance has a variable resistance value based on the plurality of system components.

In some embodiments of the invention, each power supply has a main voltage output that is also controlled. In one example of this, each power supply further has a main voltage enable signal input. A second signal line is connected to each power supply at the respective main voltage enable signal input. A second resistance is connected between the second signal line and a system reference. A plurality of power supplies are configured such that the second resistance determines a number of power supplies that must be available before the main voltage outputs are activated by the power supplies. The second resistance may have a fixed resistance value, or a variable resistance value based on, for example, a plurality of system components.

It is appreciated that the power supplies may be implemented in a variety of ways. In one contemplated approach, each power supply further has a current source and a voltage threshold detector at the respective standby voltage enable signal input. The plurality of power supplies are configured such that when a particular power supply receives input power, the particular power supply turns on the respective current source and checks a state of the respective voltage threshold detector, and such that the respective standby voltage output is activated upon detection of a voltage exceeding a threshold.

The advantages associated with embodiments of the invention are numerous. For example, embodiments of the invention allow the delay of turning on the standby voltage to a system with multiple power supplies until enough power supplies are available to provide power for the system load. This allows a reduction of the standby power rating of each power supply, and provides assurance that enough power is available to prevent power supply overload. Put another way, each power supply only meets a portion of a total standby power requirement and the system makes sure enough power supplies are available before turning on the standby voltage.

An additional advantage of this invention is an improvement in the efficiency of the standby power system. In a typical multiple power supply computing system, each power supply is capable of providing the full standby power for the system. If there are N power supplies, the standby power capacity will be N times the system requirement and each power supply will operate at 1/N of its capacity. Since power supplies are normally most efficient in the load range of 50% to 100% of their maximum rating, the excess capacity will usually result in lower than optimal operating efficiency. The invention allows the reduction in standby capacity for the power supplies such that they will operate at a value that can be 2/N or higher depending on how many supplies must be operating to activate the standby power. This results in the power supplies operating more efficiently since they will be in more desirable load range.

This invention also has advantages for the overload protection of the standby power system. When a computing system has N times the needed current capacity in the standby power system, the power distribution must have special fault current protection or the entire distribution must be sized for a fault current that is N times the operating current. This invention allows the total standby power system capacity to be reduced and can reduce the cost of overload protection for the standby power system.

In addition, it is appreciated that embodiments of the invention may take many forms. The invention comprehends systems for power control in multiple power supply environments, as well as blade systems and blade enclosures implementing one or more of the contemplated features.

BRIEF DESCRIPTION OF THE DRAWINGS

FIG. 5 is a block diagram illustrating standby power control in an embodiment of the invention;

FIG. 6 is a block diagram illustrating main power control in an embodiment of the invention;

DETAILED DESCRIPTION

Figure 1:
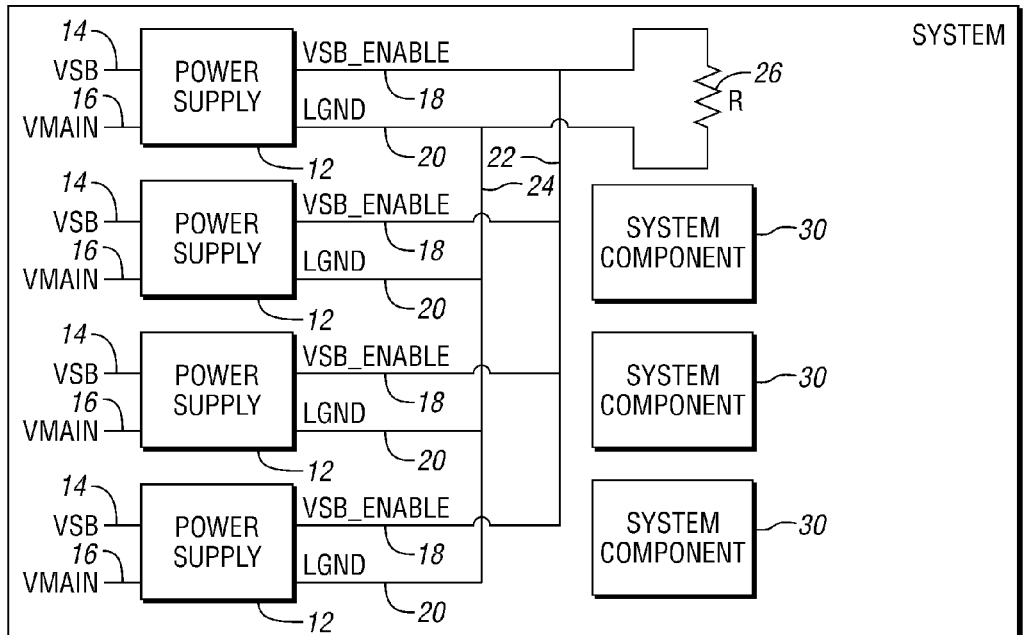
FIG. 1 illustrates standby power control in a multiple power supply environment in an embodiment of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In one embodiment of the invention, in a multiple power supply environment, a single signal line connects among the power supplies in a system. A resistance value between the signal line and system ground (logic return) determines the number of power supplies that must be available before the standby voltage is activated by the power supplies. The resistance value may be a fixed value such that a certain number of power supplies is required for initial standby voltage application. The resistance value may also be set by the system components that are present thus allowing adjustment of the number of power supplies required. The same or a similar signal may be used to control the main outputs of the power supplies when the system is set to power on without the aid of a system controller.

The signal line allows the standby power requirement of a multiple power supply system to be shared by several power supplies. Without this feature, the first power supply to receive input power would need to have enough standby power for the system and result in a total standby power capability of several times the system requirement.

In the case of a system that must power on independent of the functioning of a system controller, embodiments of the invention ensure that there will be enough power available for the full system load. Otherwise, the first power supply to provide a main power output might be overloaded and latch off in a fault mode. As each additional power supply came online, they could also experience an overload resulting in a failure of the system to achieve an operational state.

At the more detailed level, embodiments of the invention comprehend additional features. In general, features may be implemented individually or in various combinations, as appropriate for any particular application. In one embodiment of the invention, each power supply in a multiple power supply system has a common signal connection that is both a current source and voltage threshold detector inside the power supply. When a power supply receives input power, it turns on the current source and checks the state of the voltage threshold detector. If the voltage is below the threshold, the power supply does not activate its standby output voltage. Voltages above the threshold cause the standby output voltage to be activated. The resistance value between the common signal connection and the power supply return reference (ground) determines how many current sources must be active before the voltage on the signal connection will be above the threshold. When enough power supplies are available to raise the common signal connection above the threshold voltage, all of the available power supplies turn on their standby voltage at approximately the same time and avoid an overload condition that could cause a power supply fault or hang of the system components due to erratic behavior of the standby voltage. The resistance that sets the number of power supplies that must be available could be a fixed value or a parallel combination of resistors that represent the load of the actual assemblies present in the system. With no resistor present (an open connection), the power supply would immediately turn on its standby output after receiving input power.

The common signal mentioned above or a second independent signal could be used to gate the turn on of the main power supply outputs under conditions when a system controller is not available or functioning. Products such as blade servers can be set to power on even if the chassis controller is not functioning correctly. Under this special condition, there is no controller to verify that enough power supplies are active to provide the required system power and there is a possibility that the power system may experience an overload due to the load exceeding the available power system capacity. Using the common signal can ensure that a minimum number of power supplies are available before the main output is made active. The minimum number of power supplies may be a fixed value or set by the assemblies present in the system.

It is appreciated that embodiments of the invention may be employed in blade servers, and may be employed in other products having multiple power supplies and/or widely varying load conditions due to configuration options.

Turning to FIG. 1, an embodiment of the invention for standby power control in a multiple power supply environment is shown. The system 10 includes a plurality of power supplies 12. Each power supply 12 has a standby voltage output 14 and a main voltage output 16. Each power supply 12 further has a standby voltage enable signal (VSB_ENABLE) input 18 and logical return input 20. A signal line 22 connects to each power supply 12 at the respective VSB_ENABLE input 18. Each logical return input or connection 20 is connected to a system reference 24. A resistance 26 is connected between the signal line 22 and the system reference 24. The system 10 may include any number of additional system components 30. The plurality of power supplies 12 are configured such that the resistance 26 determines a number of power supplies 12 that must be available before the standby voltage outputs 14 are activated by the power supplies 12. In FIG. 1, the resistance 26 is depicted as a fixed resistance value R.

Figure 2:
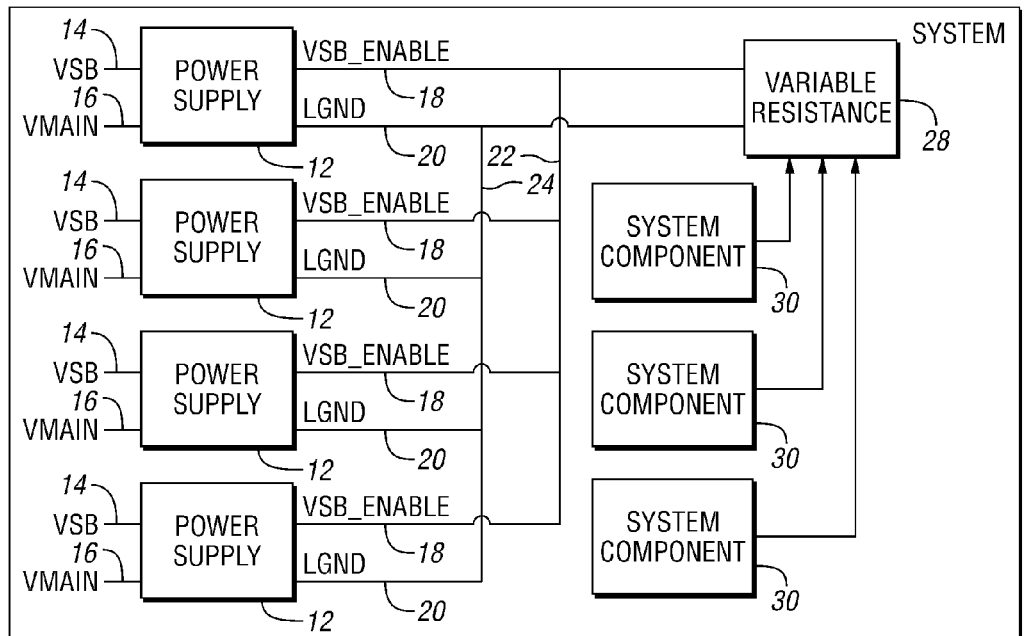
FIG. 2 illustrates standby power control in a multiple power supply environment, in which the external programming resistance is set by the system components, in an embodiment of the invention.

In the alternative, the resistance may be a variable resistance as shown in FIG. 2. In more detail, FIG. 2 illustrates system 10, power supplies 12 with associated standby voltage outputs 14 and main voltage outputs 16. Variable resistance 28 is connected between the signal line 22 and the system reference 24. The resistance 28 is a variable resistance component, and is connected to the plurality of system components 30. The resistance 28 has a variable resistance value based on the plurality of system components 30.

Figure 3:
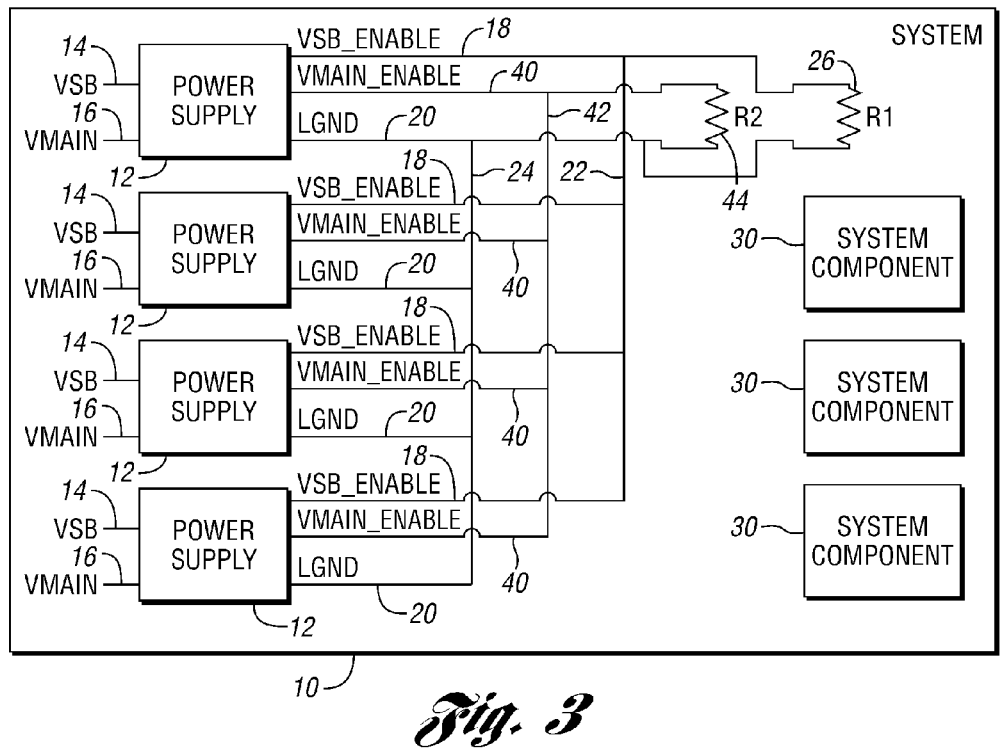
FIG. 3 illustrates standby power control in a multiple power supply environment, and main power control, in a system set to power on without the aid of a system controller, in an embodiment of the invention.

The VSB_ENABLE signal may also be used to control the main voltage outputs 16 of the power supplies 12 when the system 10 is set to power on without the aid of a system controller. In the alternative, a separate, similar signal may be used to control the main voltage outputs 16, as illustrated in FIG. 3. In FIG. 3, each power supply 12 further has a main voltage enable signal (VMAIN_ENABLE) input 40. A second signal line 42 connects to each power supply 12 at the respective VMAIN_ENABLE input 40. A second resistance 44 is connected between the second signal line 42 and the system reference 24. The plurality of power supplies 12 are further configured such that the second resistance 44 determines a number of power supplies that must be available before the main voltage outputs 16 are activated by the power supplies 12. The second resistance 44 is shown as having a fixed resistance value R2, and the first resistance 26 is shown in FIG. 3 as having a fixed resistance value R1. It is appreciated that first resistance 26 and/or second resistance 44 may be a variable resistance component, for example, connected to a plurality of system components 30 and having a variable resistance value based on the plurality of system components 30 connected thereto.

Figure 4:
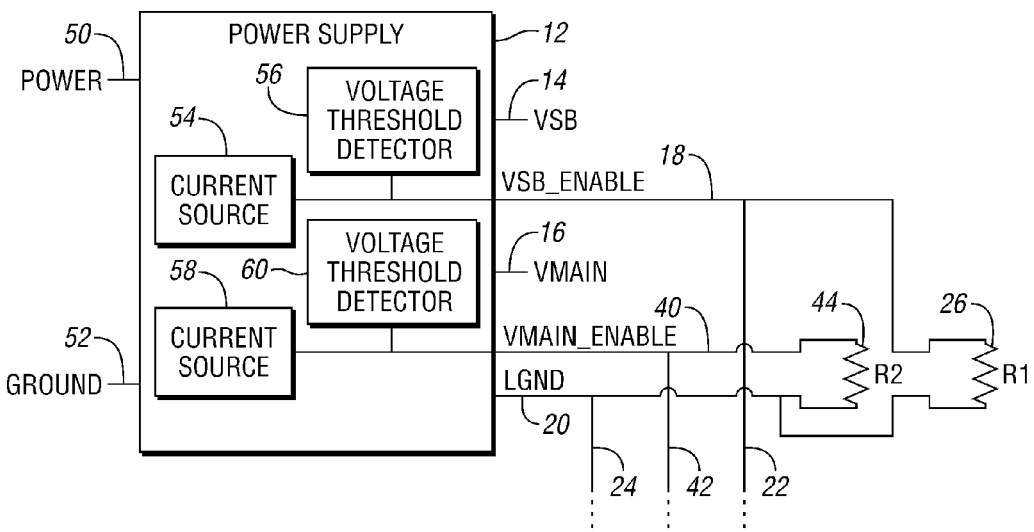
FIG. 4 illustrates a power supply having a common signal connection that is both a current source and a voltage threshold detector inside the power supply, in an embodiment of the invention.

FIG. 4 illustrates a power supply 12 in further detail. As shown, power supply 12 includes power and ground connections 50 and 52, respectively, standby voltage output 14 and main voltage output 16. Power supply 12 includes, for the VSB_ENABLE signal input 18, a current source 54 and a voltage threshold detector 56. Power supply 12 further includes, for the VMAIN_ENABLE signal input 40, a current source 58 and a voltage threshold detector 60. For standby power control, the plurality of power supplies 12 are configured such that when a particular power supply 12 receives input power (connection 50), the particular power supply 12 turns on the respective current source 54 and checks a state of the respective voltage threshold detector 56, and such that the respective standby voltage output 14 is activated upon detection of a voltage exceeding a threshold.

In a similar fashion, for separate main power control with the VMAIN_ENABLE signal input 40, the plurality of power supplies 12 are configured such that when a particular power supply 12 receives input power (connection 50), the particular power supply 12 turns on the respective current source 58 and checks a state of the respective voltage threshold detector 60, and such that the respective main voltage output 16 is activated upon detection of a voltage exceeding a threshold.

FIG. 5 illustrates standby power control in an embodiment of the invention. The process starts at block 70. At block 72, a power supply receives input power. At block 74, the internal current source of the power supply connected to the VSB_ENABLE signal line is turned on. At block 76, the state of the internal power supply voltage threshold detector is checked. At decision block 78, the detected voltage is compared to the threshold voltage. At block 80, if the detected voltage exceeds the threshold, standby output voltages are activated. The process ends at block 82.

FIG. 6 illustrates main power control in an embodiment of the invention. The process starts at block 90. At block 92, a power supply receives input power. At block 94, the internal current source of the power supply connected to the VMAIN_ENABLE signal line is turned on. At block 96, the state of the internal power supply voltage threshold detector is checked. At decision block 98, the detected voltage is compared to the threshold voltage. At block 100, main voltage outputs are activated when the detected voltage exceeds the threshold. The process ends at block 102.

Figure 7:
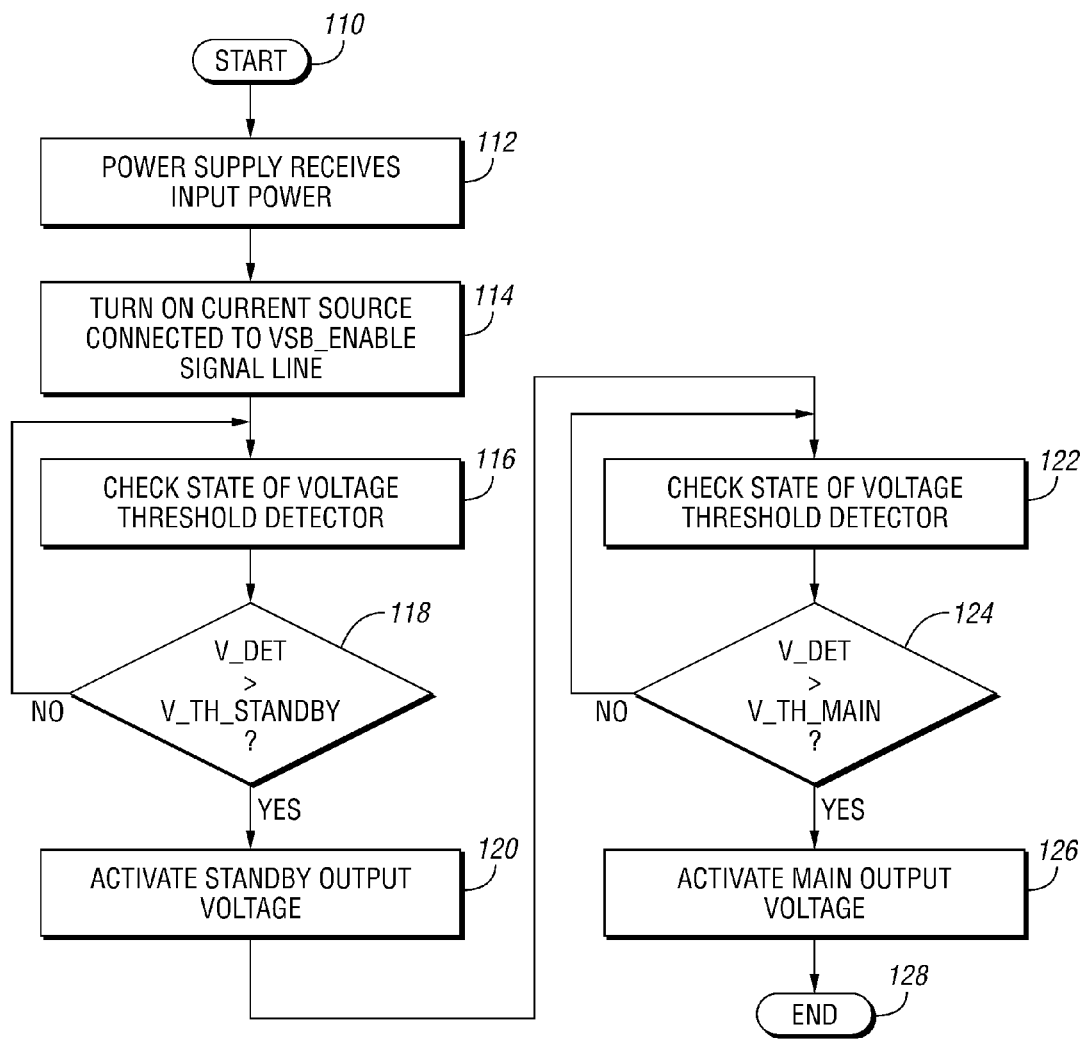
FIG. 7 is a block diagram illustrating the use of a single common signal for both standby power control and main power control in an embodiment of the invention.

FIGS. 5-6 taken together describe process flow for a power supply having separate VSB_ENABLE and VMAIN_ENABLE signal inputs. Some embodiments of the invention may use the VSB_ENABLE signal input for controlling both standby output voltages and main output voltages, as shown in FIG. 7.

The process starts at block 110. At block 112, a power supply receives input power. At block 114, the internal current source connected to the VSB_ENABLE signal line is turned on. At block 116, the state of the voltage threshold detector is checked. At decision block 118, the detected voltage is compared to the threshold voltage for standby voltage power control. At block 120, standby output voltages are activated if the detected voltage exceeds the threshold. At block 122, the state of the voltage threshold detector is checked; and at block 124, the detected voltage is compared to the threshold voltage for main output voltage power control. At block 126, main output voltages are activated if the detected voltage exceeds the threshold. The process ends at block 128.

Figure 8:
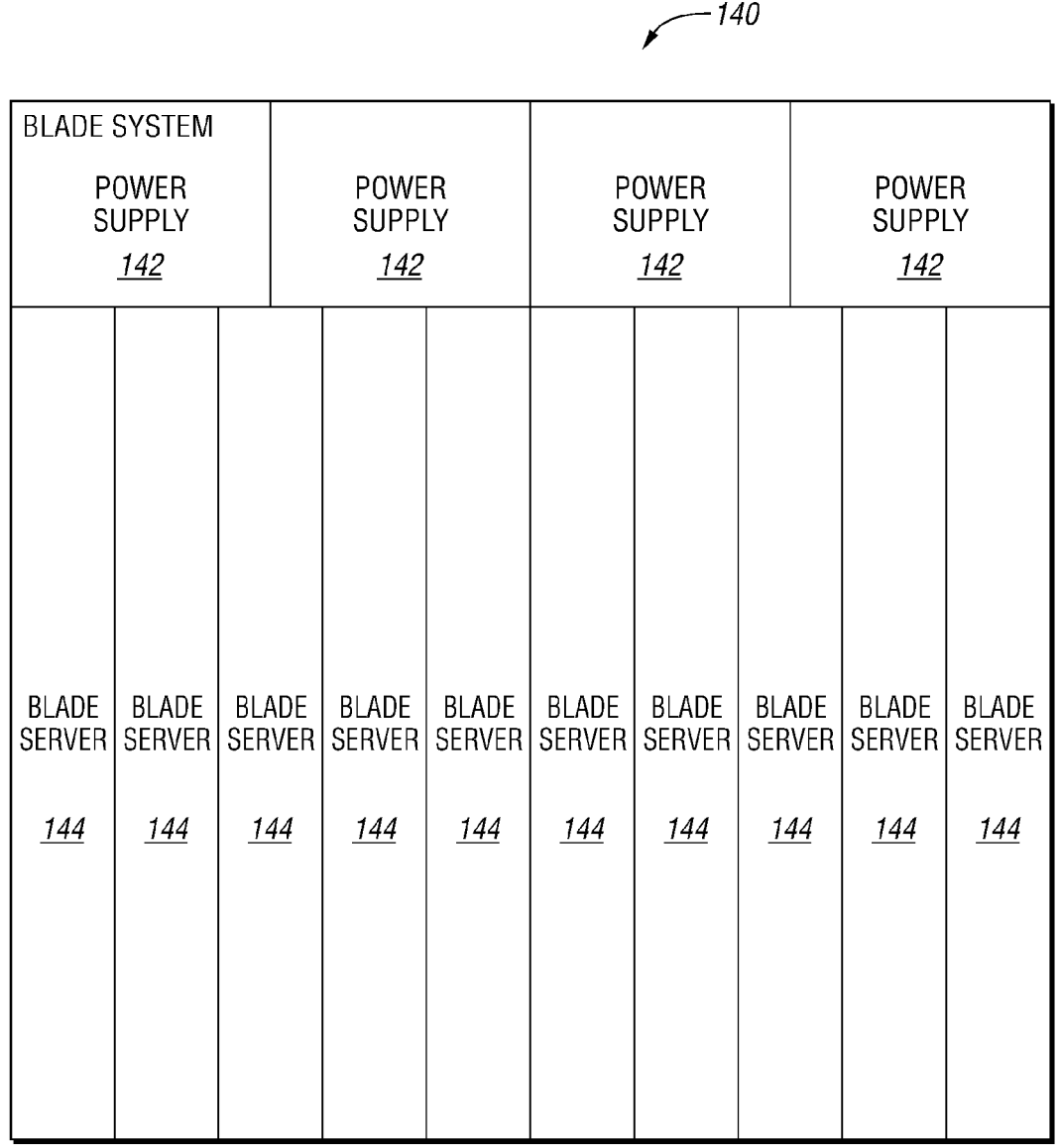
FIG. 8 illustrates a blade system including a blade enclosure and blade servers in an embodiment of the invention.

FIG. 8 illustrates a blade system 140. The blade enclosure includes multiple power supplies 142, and multiple blade servers 144. In embodiments of the invention, standby power control is provided in the blade system 140 by utilizing a signal line connected to each power supply 142 disposed in the blade system 140, and a resistance, such that the resistance determines a number of power supplies that must be available before the standby voltage outputs are activated by the power supplies. Other features described above may also be employed.

It is appreciated that embodiments of the invention may be implemented in a variety of ways. In one particular implementation, power supplies connected in parallel share a VSB_ENABLE signal to delay the rise of the standby power output until there is sufficient current capacity available for the defined system load. A programming resistance between the VSB_ENABLE signal line and logical ground on the system side determines how many power supplies must be present and have input power before the standby output voltage is activated. There will not be any additional standby voltage output delay if the standby voltage output bus has voltage present as in the case of inserting a power supply into an operating system. Once active, the standby voltage shall remain active if the VSB_ENABLE signal goes below the threshold voltage.

In more detail, a particular implementation uses a threshold voltage of 1.0V. The pull-up voltage is an internal power supply voltage of 3V minimum. Pull-up resistance provides an output current of 1 mA at an output voltage of 1.0V.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for standby power control in a multiple power supply environment, the system comprising:
    a plurality of power supplies, each power supply having a standby voltage output and having a standby voltage enable signal input;
    a signal line connected to each power supply at the respective standby voltage enable signal input;
    a resistance connected between the signal line and a system reference; and
    wherein the plurality of power supplies are configured such that the resistance determines a number of power supplies that must be available before the standby voltage outputs are activated by the power supplies.

2. The system of claim 1 wherein the resistance has a fixed resistance value.

3. The system of claim 1 further comprising:
    a plurality of system components;
    wherein the resistance is a variable resistance component connected to the plurality of system components; and wherein the resistance has a variable resistance value based on the plurality of system components.

4. The system of claim 1 further comprising:
each power supply having a main voltage output and having a main voltage enable signal input;
a second signal line connected to each power supply at the respective main voltage enable signal input;
a second resistance connected between the second signal line and a system reference; and
wherein the plurality of power supplies are configured such that the second resistance determines a number of power supplies that must be available before the main voltage outputs are activated by the power supplies.

5. The system of claim 4 wherein the second resistance has a fixed resistance value.

6. The system of claim 4 further comprising:
a plurality of system components;
wherein the second resistance is a variable resistance component connected to the plurality of system components; and
wherein the second resistance has a variable resistance value based on the plurality of system components.

7. The system of claim 1 wherein each power supply has a logical return connection connected to the system reference.

8. The system of claim 1 further comprising:
each power supply further having a current source and a voltage threshold detector at the respective standby voltage enable signal input; and
wherein the plurality of power supplies are configured such that when a particular power supply receives input power, the particular power supply turns on the respective current source and checks a state of the respective voltage threshold detector, and such that the respective standby voltage output is activated upon detection of a voltage exceeding a threshold.

9. The system of claim 1 wherein each power supply only meets a portion of a total standby power requirement.

10. A blade system comprising:
a blade enclosure;
a plurality of power supplies disposed in the blade enclosure, each power supply having a standby voltage output and having a standby voltage enable signal input;
a signal line connected to each power supply at the respective standby voltage enable signal input;
a resistance connected between the signal line and a system reference; and
wherein the plurality of power supplies are configured such that the resistance determines a number of power supplies that must be available before the standby voltage outputs are activated by the power supplies.

11. The system of claim 10 wherein the resistance has a fixed resistance value.

12. The system of claim 10 further comprising:
a plurality of system components disposed in the blade enclosure;
wherein the resistance is a variable resistance component connected to the plurality of system components; and
wherein the resistance has a variable resistance value based on the plurality of system components.

13. The system of claim 10 further comprising:
each power supply having a main voltage output and having a main voltage enable signal input;
a second signal line connected to each power supply at the respective main voltage enable signal input;
a second resistance connected between the second signal line and a system reference; and
wherein the plurality of power supplies are configured such that the second resistance determines a number of power supplies that must be available before the main voltage outputs are activated by the power supplies.

14. The system of claim 13 wherein the second resistance has a fixed resistance value.

15. The system of claim 13 further comprising:
a plurality of system components;
wherein the second resistance is a variable resistance component connected to the plurality of system components; and
wherein the second resistance has a variable resistance value based on the plurality of system components.

16. The system of claim 10 wherein each power supply has a logical return connection connected to the system reference.

17. The system of claim 10 further comprising:
each power supply further having a current source and a voltage threshold detector at the respective standby voltage enable signal input; and
wherein the plurality of power supplies are configured such that when a particular power supply receives input power, the particular power supply turns on the respective current source and checks a state of the respective voltage threshold detector, and such that the respective standby voltage output is activated upon detection of a voltage exceeding a threshold.

18. The system of claim 10 wherein each power supply only meets a portion of a total standby power requirement.

* * * * *